US011764835B2

(12) United States Patent
Ravi et al.

(10) Patent No.: US 11,764,835 B2
(45) Date of Patent: Sep. 19, 2023

(54) LENSING SYSTEMS FOR WIRELESS COMMUNICATIONS

(71) Applicant: Intel Corporation, Santa Clara, CA (US)

(72) Inventors: Ashoke Ravi, Portland, OR (US); Ofir Degani, Nes-Ammin (IL); Ronen Kronfeld, Shoham Ta (IL); Harry Skinner, Beaverton, OR (US); Seong-Youp Suh, Portland, OR (US); Tae-Young Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 28 days.

(21) Appl. No.: 17/470,332

(22) Filed: Sep. 9, 2021

(65) Prior Publication Data

US 2022/0209829 A1 Jun. 30, 2022

(30) Foreign Application Priority Data

Dec. 24, 2020 (EP) ..................................... 20217197

(51) Int. Cl.
*H04B 7/0413* (2017.01)
*H01Q 3/46* (2006.01)
(Continued)

(52) U.S. Cl.
CPC ............ *H04B 7/0413* (2013.01); *H01Q 3/46* (2013.01); *H01Q 15/04* (2013.01); *H04B 7/0639* (2013.01); *H04B 7/0695* (2013.01)

(58) Field of Classification Search
CPC .. H04B 7/0413; H04B 7/0639; H04B 7/0695; H01Q 15/04; H01Q 3/46
(Continued)

(56) References Cited

U.S. PATENT DOCUMENTS

2017/0149144 A1* 5/2017 Gallagher ................ H01Q 1/38
2020/0187222 A1* 6/2020 Rao ........................ H04L 5/0073
(Continued)

FOREIGN PATENT DOCUMENTS

WO WO-2016030571 A1 * 3/2016 ............... G01S 3/46

OTHER PUBLICATIONS

European Patent Office, Search Report issued for EP 20217197.1, 9 pgs., dated Jun. 22, 2021.
(Continued)

*Primary Examiner* — Leila Malek
(74) *Attorney, Agent, or Firm* — Banner & Witcoff Ltd.

(57) ABSTRACT

A communication device may include a millimeter wave (mm-wave) antenna array having antenna elements, a mm-wave element (e.g. lens), and one or more transceivers (e.g. first and second transceivers). The mm-wave lens may be configured to adjust the first beam and the second beam as the first and second beams pass through the mm-wave lens. The first transceiver can selectively couple to the antenna elements, the first transceiver being configured to drive a first selected antenna element of the antenna elements to transmit a beam from the selected first antenna element. The second transceiver may selectively couple to the antenna elements, the second transceiver being configured to drive a second selected antenna element of the antenna elements to transmit a second beam from the selected second antenna element.

21 Claims, 9 Drawing Sheets

(51) Int. Cl.
*H01Q 15/04* (2006.01)
*H04B 7/06* (2006.01)

(58) Field of Classification Search
USPC .......................................... 375/262
See application file for complete search history.

(56) References Cited

U.S. PATENT DOCUMENTS

2020/0349545 A1* 11/2020 Moshe .................... G01S 13/88
2021/0119751 A1*  4/2021 Mundarath ........... H04L 1/0045
2021/0391904 A1* 12/2021 Jam ....................... H04B 7/0695

OTHER PUBLICATIONS

Nair, et al., "Exploiting Low Complexity Beam Allocation in Multi-User Switched Beam Millimeter Wave Systems", 10 pgs , IEEE Access, vol. 7, Jan. 7, 2019.
Zeng, et al., "Cost-Effective Millimeter-Wave Communications with Lens Atenna Array", 7 pgs., IEEE Wireless Communications, vol. 24, No. 4, Aug. 21, 2017.
Bai, et al., "A Compact, Wide Field-of-View Gradient-index Lens Antenna for Millimeter-wave MIMO on Mobile Devices", 4 pgs., Arxiv. Org, Cornell University Library, Jul. 28, 2017.
Xi, et al., "A Reconfigurable Planar Fresnel Lens for Millimeter-Wave 5G Frontends", 10 pgs., IEEE Transaction on Microwave Theory and Techniques, vol. 68, No. 11, Nov. 1, 2020.

* cited by examiner

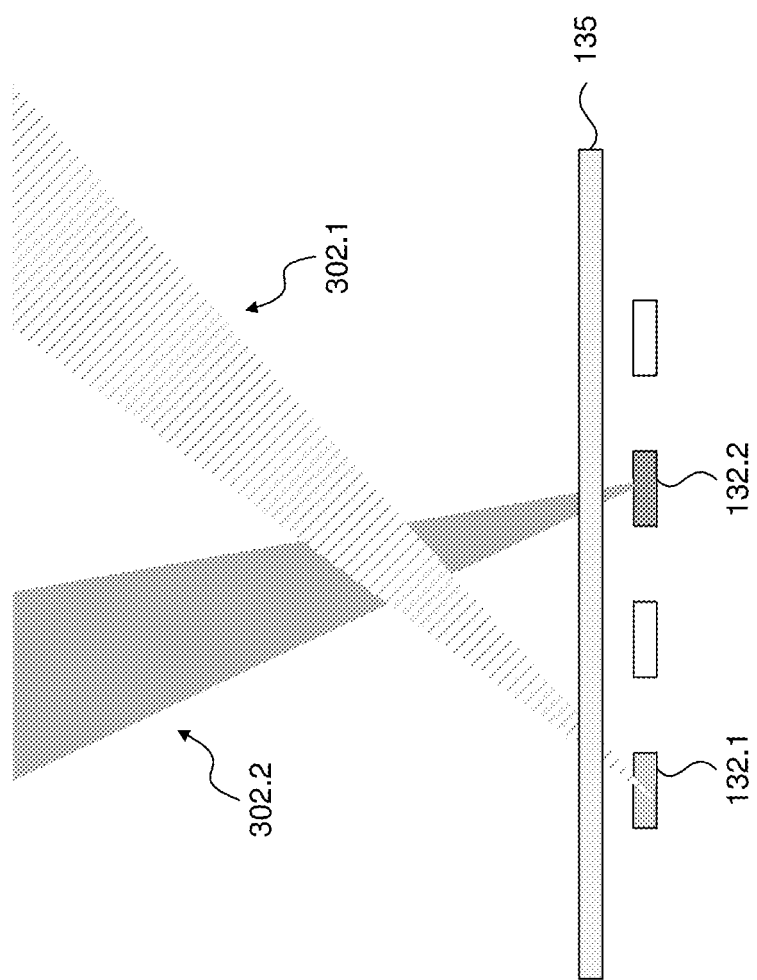

LENSING SYSTEMS FOR WIRELESS COMMUNICATIONS

TECHNICAL FIELD

Various aspects of this disclosure generally relate to mm-wave communication systems. Some aspects relate to mm-wave communication systems that use mm-wave elements (e.g. lens).

BACKGROUND

The use of various types of communication devices or user devices (or user equipment (UE)), such as smart phones and tablets, continues to increase, as does amount of data and bandwidth being used by various applications, such as video streaming, operating on these UEs. In some situations, the UEs may communicate with a base station via the licensed bands (e.g., third-generation partnership project (3GPP) bands) using network resources. The UEs may alternately use the unlicensed (Wifi) bands to communicate. Relatively recently, additional mm-wave bands have been allocated for UE communication to support the anticipated demand for both high data rates and a high density of user devices in a particular geographical area. The relatively newly-released 60-GHz band offers benefits and advantages including operation in the unlicensed band, which permits flexible deployment and removes the use of significant capital to obtain a spectrum license. In addition, the 60-GHz band offers secure and virtually interference-free operation due to scoped channel propagation characteristics and the use of steerable narrow beams. The 60-GHz band also offers high level of frequency re-use with 7 GHz of available spectrum. However, issues arise with the advent of any new technology, including band use in the 60-GHz band.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

FIG. 3B illustrates examples of beam transmissions of the communication device of FIG. 3A, according to an exemplary aspect of the present disclosure.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1A:
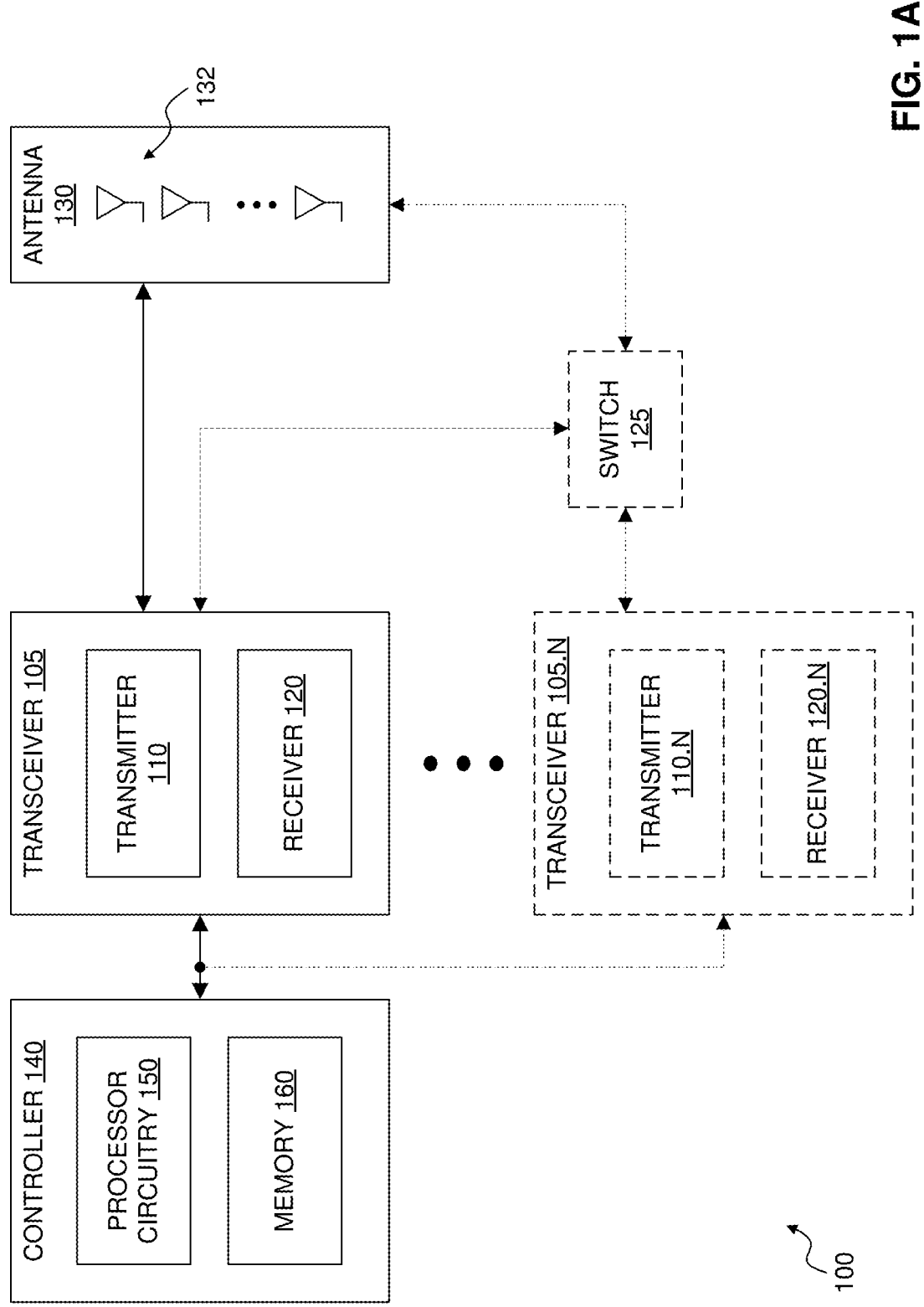
FIG. 1A illustrates a communication device according to exemplary aspects of the present disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Aspects described herein generally relate to mm-wave communication systems. Aspects can also include wireless networks, wireless communications, and corresponding wireless communication devices implementing one or more mm-wave elements (e.g. lens).

The aspects of the present disclosure will be described with reference to wireless systems configured for the millimeter wave (mm-Wave) frequency spectrum (e.g., 24 GHz-300 GHz), but is not limited thereto. In one or more aspects, the system is configured to operate in the 60 GHz band (57-66 GHz) mm-wave band. The aspects of the present disclosure may be applied to fifth generation (5G) wireless technologies and related spectrums, or other wireless technologies and spectrums as would be understood by one of ordinary skill in the relevant arts.

The communication system may include may include devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards. Other Aspects of the present disclosure pertain to mobile wireless communication devices such as the 4G and 5G cellular communication standards. Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth, ZigBee, or the like.

Wireless communications are expanding into communications having increased data rates (e.g., from Institute of Electrical and Electronics Engineers (IEEE) 802.11a/g to IEEE 802.11n to IEEE 802.11ac and beyond). With the expansion, the WiFi high band (5-7 GHz) is expected to become more congested with the dense deployment of wireless communication devices. The mm-wave frequency bands may be used to support the ever-increasing demand for data. In particular, the 60 GHz unlicensed band is of great interest on account of the available spectrum, global interoperability and propagation properties conducive to dense indoor deployment.

Other communication standards/protocols have attempted to use mm-wave frequencies but have not had widespread adoption due to high bill of material (BOM) cost. Cost is expected to be an even more serious limitation for future internet-of-things (IoT) and smart device applications. In mm-wave systems, a phased array antenna approach may be used as in WiFi solutions, and the link may be asymmetric (i.e. more features and higher complexity may be provided on the access point (AP) while the user equipment (UE) may be designed for low cost and small form-factor. In the mm-wave context, this translates to higher directional gain (e.g., larger arrays) on the AP whereas the UE may support a smaller directivity (e.g. ~10 dB) and coarse beam width and resolution (~2-3 bits). In a phased array antenna system, multiple antennas may be used to simultaneously transmit the same signal with different phases to steer the resulting beam from the array. A phased array antenna may allow the UE to meet range specifications by increasing the directional antenna gain. However, use of a phased array may result in expensive solutions, which have resulted in low adoption rates (e.g., WiGig). The phase array solution power consumption is also relatively high due to the multiple radio frequency (RF) chains used for the individual antennas, as well as lossy components within the array, such as phase shifting and/or splitting/combining elements. The robustness of the communication link is also a concern because initial acquisition time for phased arrays requires complex beam training. The links are also primarily line-of-sight and suffer from dropped connections when an obstacle appears between the access point and client or from fast fading due to scattering in cluttered indoor environments that are expected in enterprise and industrial deployments.

Extending the data rates in wireless transceivers is achieved in multiple ways: from bandwidth increase, higher modulations, carrier aggregation to multi-link and multiple-input multiple-output (MIMO) operations. The latter two in particular also open up support for many new use cases: some examples (not exhaustive) include support for simultaneous peer-peer (e.g. wireless display) and network connectivity, mesh networks of autonomous robots and drones, cooperative beam-forming by client nodes to increase network coverage and range etc. Extending the mm-wave phase array transceiver to support MIMO or Multi-Link requires adding additional phase arrays which results in major power, area and cost increase. Dual feed polarized antenna elements in the phase array have been proposed for MIMO, but this still requires doubling the number of chains, increased silicon area, cost and power.

Aspects of the disclosure include a low-cost mm-wave radio solution that includes lensing that advantageously provides link robustness by enabling simultaneous communication and scanning for alternate paths in case of the link being disrupted. Aspects also provide improved quality of service (QoS) such as the ability to perform soft hand-off or improve channel capacity by combining the signals from multiple APs. In addition, aspects allow extending the single chain lensing concept to support MIMO and Multi-Link mm-Wave solution for small or even no additional area/cost and minimal power impact.

Aspects of the present disclosure are directed to a mm-wave communication device that includes a lensing system. The communication device can include a small number (e.g. 2) of transceivers and switches configured to connect to the multiple radiating/antenna elements of the antenna and lensing system to: optimize the main beam angle-of-arrival; use the additional transceiver(s) to scan through the other radiating elements to determine the best alternate beam, or to use the signal received or transmitted along alternate beam direction to improve the link robustness (e.g. a diversity technique); scan and perform soft hand-off from multiple APs; and support MIMO and multi-link channels through the simultaneous use of independent beams or polarizations.

The communication device of the present disclosure advantageously improves mm-wave system robustness and recovery if the main beam is interrupted. This realizes the requirements for ultra-reliable low latency links. The communication device also provides flexibility/re-configurability to configure the mm-wave system to perform either diversity combining (to improve range or throughput) or soft hand-off, as well as improve data rates or range (e.g. MIMO) or support new modes of operation (e.g. multi-link).

FIG. 1A illustrates a communication device 100 according to an exemplary aspect of the present disclosure. The communication device 100 is configured to transmit and/or receive wireless communications via one or more wireless technologies. For example, the communication device 100 can be configured for wireless communications conforming to the millimeter wave (mm-Wave) spectrum (e.g., 24 GHz-300 GHz), including the 60 GHz band (57-66 GHz) mm-wave band. The communication device 100 can additionally be configured for wireless communications conforming to, for example, fifth generation (5G) cellular communication protocols, such as 5G protocols that use the 28 GHz frequency spectrum, and/or communication protocols conforming to the Wireless Gigabit Alliance (WiGig) standard, such as IEEE 802.11ad and/or IEEE 802.11ay that use the 60 GHz frequency spectrum. The communication device 100 is not limited to these communication protocols and can be configured for one or more additional or alternative communication protocols, such as one or more 3rd Generation Partnership Project's (3GPP) protocols (e.g., Long-Term Evolution (LTE)), one or more wireless local area networking (WLAN) communication protocols, and/or one or more other communication protocols as would be understood by one of ordinary skill in the relevant arts. For example, the communication device 100 can be configured to transmit and/or receive wireless communications using one or more communication protocols that utilize the millimeter wave (mm-Wave) spectrum (e.g., 24 GHz-300 GHz), such as the 60 GHz band (57-66 GHz) mm-wave band.

The communication device 100 can be configured to communicate with one or more other communication devices, including, for example, one or more base stations, one or more access points, one or more other communication devices, one or more network components, and/or one or more other devices as would be understood by one of ordinary skill in the relevant arts.

In an exemplary aspect, the communication device 100 includes a controller 140 communicatively coupled to one or more transceivers 105. In an exemplary aspect, the controller 140 includes processor circuity 150 that is configured to control the overall operation of the communication device 100, such as the operation of the transceiver(s) 105. The processor circuitry 150 may be configured to control the transmitting and/or receiving of wireless communications via the transceiver(s) 105.

In an exemplary aspect, the processor circuitry 150 is configured to perform one or more baseband processing functions (e.g., media access control (MAC), encoding/decoding, modulation/demodulation, data symbol mapping; error correction, etc.) in cooperation with the transceiver 105 or instead of such operations/functions being performed by the transceiver 105. The processor circuitry 150 is configured to run one or more applications and/or operating systems; power management (e.g., battery control and monitoring); display settings; volume control; and/or user interactions via one or more user interfaces (e.g., keyboard, touchscreen display, microphone, speaker, etc.) in one or more aspects.

In an exemplary aspect, the controller 140 further includes a memory 160 that stores data and/or instructions, where when the instructions are executed by the processor circuitry 150, controls the processor circuitry 150 to perform the functions described herein.

The memory 160 may be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 160 can be non-removable or removable, or a combination of both.

Examples of the communication device 100 include (but are not limited to) a mobile computing device (mobile device)—such as a laptop computer, a tablet computer, a mobile telephone or smartphone, a "phablet," a personal digital assistant (PDA), and mobile media player; a wearable computing device—such as a computerized wrist watch or "smart" watch, and computerized eyeglasses; and/or internet-of-things (IoT) device. In some aspects of the present disclosure, the communication device 100 may be a stationary communication device, including, for example, a stationary computing device—such as a personal computer (PC), a desktop computer, television, smart-home device, security device (e.g., electronic/smart lock), automated teller machine, a computerized kiosk, and/or an automotive/aeronautical/maritime in-dash computer terminal. The communication device 100 may also be remotely controllable device, such as a drone or other controllable device.

In one or more aspects, the communication device 100 or one or more components of the communication device 100 is additionally or alternatively configured to perform digital signal processing (e.g., using a digital signal processor (DSP)), modulation and/or demodulation (using a modulator/demodulator), a digital-to-analog conversion (DAC) and/or an analog-to-digital conversion (ADC) (using a respective DA and AD converter), an encoding/decoding (e.g., using encoders/decoders having convolution, tail-biting convolution, turbo, Viterbi, and/or Low Density Parity Check (LDPC) encoder/decoder functionality), frequency conversion (using, for example, mixers, local oscillators, and filters), Fast-Fourier Transform (FFT), precoding, and/or constellation mapping/de-mapping to transmit and/or receive wireless communications conforming to one or more wireless protocols and/or facilitate the beamforming scanning operations and/or beamforming communication operations.

The transceiver(s) 105 is configured to transmit and/or receive wireless communications via one or more wireless technologies. In an exemplary aspect, the transceiver 105 includes processor circuitry that is configured for transmitting and/or receiving wireless communications conforming to one or more wireless protocols.

In an exemplary aspect, the transceiver 105 includes a transmitter 110 and a receiver 120 configured for transmitting and receiving wireless communications, respectively, via one or more antennas 130. In aspects having two or more transceivers 105, the two or more transceivers 105 can have their own antenna 130, or can share a common antenna via a switch 125. The switch 125 may function as a duplexer and/or diplexer in one or more aspects. In an exemplary aspect, the transceiver 105 (including the transmitter 110 and/or receiver 120) is configured to perform one or more baseband processing functions (e.g., media access control (MAC), encoding/decoding, modulation/demodulation, data symbol mapping; error correction, etc.).

The antenna 130 can include one or more antenna/radiating elements 132 forming an integer array of antenna elements. In an exemplary aspect, the antenna 130 is a phased array antenna that includes multiple radiating elements (antenna elements) each having a corresponding phase shifter. The antenna 130 configured as a phased array antenna can be configured to perform one or more beamforming operations that include generating beams formed by shifting the phase of the signal emitted from each radiating element to provide constructive/destructive interference so as to steer the beams in the desired direction. In an exemplary aspect, the antenna 130 is configured as an array with elements 132 and is fed by a single RF chain. The single RF chain may automatically switch between the individual antenna elements 132 of the antenna array 130. In some aspects, the antenna elements 132 of the antenna 130 may be activated individually to provide the mm-wave signal rather than as being part of a phased array.

Figure 1B:
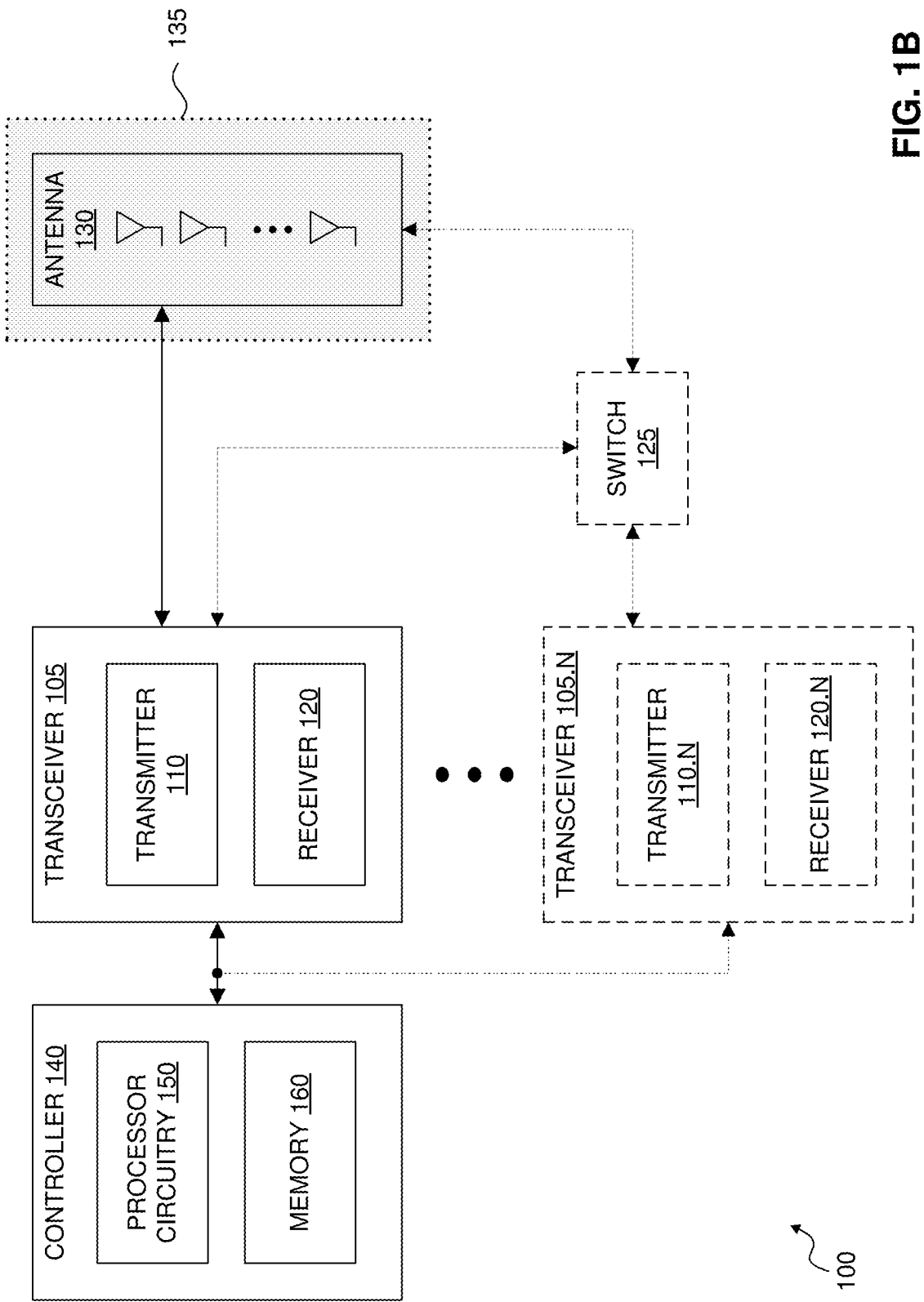
FIG. 1B illustrates the communication device of FIG. 1A that further includes a millimeter-wave element (e.g. lens), according to exemplary aspects of the present disclosure.

In an exemplary aspect, as shown in FIG. 1B, the communication device 100 further includes a mm-wave element, such as a lens 135 disposed on a portion of or the entirety of the antenna 132. In this arrangement, the lens 135 may be disposed on and over some of all of the antenna elements 132. The mm-Wave lens 135 may be used to address the increased costs for a phase array antenna system. The link asymmetry may be exploited to reduce silicon and bill of material costs and reduce power dissipation of the device in which the array is located (UE or AP) through the use of a single RF chain switched to/from a small number (e.g., 4-8) radiating elements coupled into a lens. That is, a single-chain mm-wave beam steerable lens antenna may be used as described below.

In an exemplary aspect, the lens 135 may be configured with lens thickness and/or focal length to provide desired radiation characteristics. The lens 135 may be a diffractive or optical lens. In an exemplary aspect, the diffraction-based mm-Wave lens can be implemented on the same printed circuit board (PCB) of the module while optics-based lens can be implemented with low cost plastic molding or 3D printing, but the disclosure is not limited thereto. In aspects that include lens 135, the communication device 100 may advantageously avoid the use of multiple RF chains and lossy phase shifters, simplify the digital pre-distortion (DPD) to enhance the performance and efficiency of the transceiver in addition to providing guaranteed backward comparability to legacy WiFi solutions. Note that the various electronic components of the transceiver chain (e.g., amplifiers, filters, isolators, mixers, etc. . . . ) are not shown for convenience.

In an exemplary aspect, the lens 135 may be substantially any shape to provide a desired amount of steering of the beam from the mm-wave antenna array 130. The mm-wave antenna array 130 may be disposed at or near (e.g. within about 0.1-0.2 mm of) the focal length of the lens 135. The lens 135 may be of about the same dimension (e.g., slightly larger than) as the mm-wave antenna array 130 as shown and described in more detail below. In some aspects, the lens 135 may be formed of a material, such as plastic, that permits propagation of RF signals at the wavelength of the mm-wave antenna array 130 without significant degradation. The lens 135 may act like an RF window at other frequencies outside of the mm-wave band and thus not appreciably affect propagation of signals of these other frequencies. In other embodiments, the lens 135 may be formed from a combination of different materials including metals or other composites. In an exemplary aspect, the lens 135 is configured to adjust the angle resolution, beam width, beam direction, and/or one or more other beam characteristics as would be understood by one of ordinary skill in the art. In an exemplary aspect, the lens 135 is an optical lens, a diffraction lens, a dielectric lens, a Luneburg lens, a Fresnel Zone Plate (FZP) lens, or other lens as would be understood by one of ordinary skill in the art.

In an exemplary aspect, the lens 135 is a diffraction lens configured to focus the mm-wave signal from the activated antenna element(s) 132 of the antenna 130 configured as a reconfigurable switching antenna array. The diffraction lens 135 may be a Fresnel Zone Plate (FZP) lens. The antenna 130 may be disposed at or near (e.g. within a few tenths of a mm of) the near-field focal point of the FZP lens 135. The FZP lens 135 can be formed from a metal (such as Al) to focus the mm-wave signals transmitted by each antenna element 132 of the antenna 130. The FZP lens 135 may contain a set of concentric rings that alternate between being opaque and transparent to the radiation of a desired frequency impinging on the FZP lens 135 (in this case, mm-wave frequencies), diffracting around the opaque zones and providing constructive interference at the desired focus.

The lens 135 can be integrated into the packaging of the antenna 130 through low cost plastic molding, through 3D printing techniques, or patterned using sputtering and/or other deposition processes. For example, the lens 135 may be created using traces on a printed circuit board (PCB) to create the lensing effect and therefore incur a negligible cost overhead. While the lens 135 may be integrated with the focal source antenna array in the multi-layer PCB/package, in other aspects the lens 125 may be integrated in a metal cover of a laptop computer or mobile device.

In some aspects, the focal length d of the lens 135 may be about 4.9 mm (about the wavelength of the beam from the radiating elements of the reconfigurable switching antenna 130), and the reconfigurable switching antenna array 130 may lie essentially at the focal length below the FZP lens 135. That is, in some aspects, the focal length d of the FZP lens 135 may be within about 0.1-0.2 mm of 4.9 mm. In other aspects, the focal length may be able to be further reduced, which may be attractable for mobile devices such as laptops and tablets, but depend on more precise positioning between the FZP lens 135 and the reconfigurable switching antenna array 130. The FZP lens 135 can have a circular, ovular or rectangular shape, for example, but is not limited thereto.

In some aspects, the reconfigurable switching antenna array 130 may be smaller than the center circle of the FZP lens 135. In other aspects, the reconfigurable switching antenna array 130 may be larger than the center circle of the FZP lens 135 but smaller than the entire FZP lens 135. However, in an exemplary aspect, the reconfigurable switching antenna array 130 is not larger than the entire FZP lens 135 as the size of the reconfigurable switching antenna array 130 is related to the field-of-view (FOV), i.e., a larger (longer) array will have a larger FoV and thus a larger FZP lens may be used to focus and steer the beam.

Figure 2:
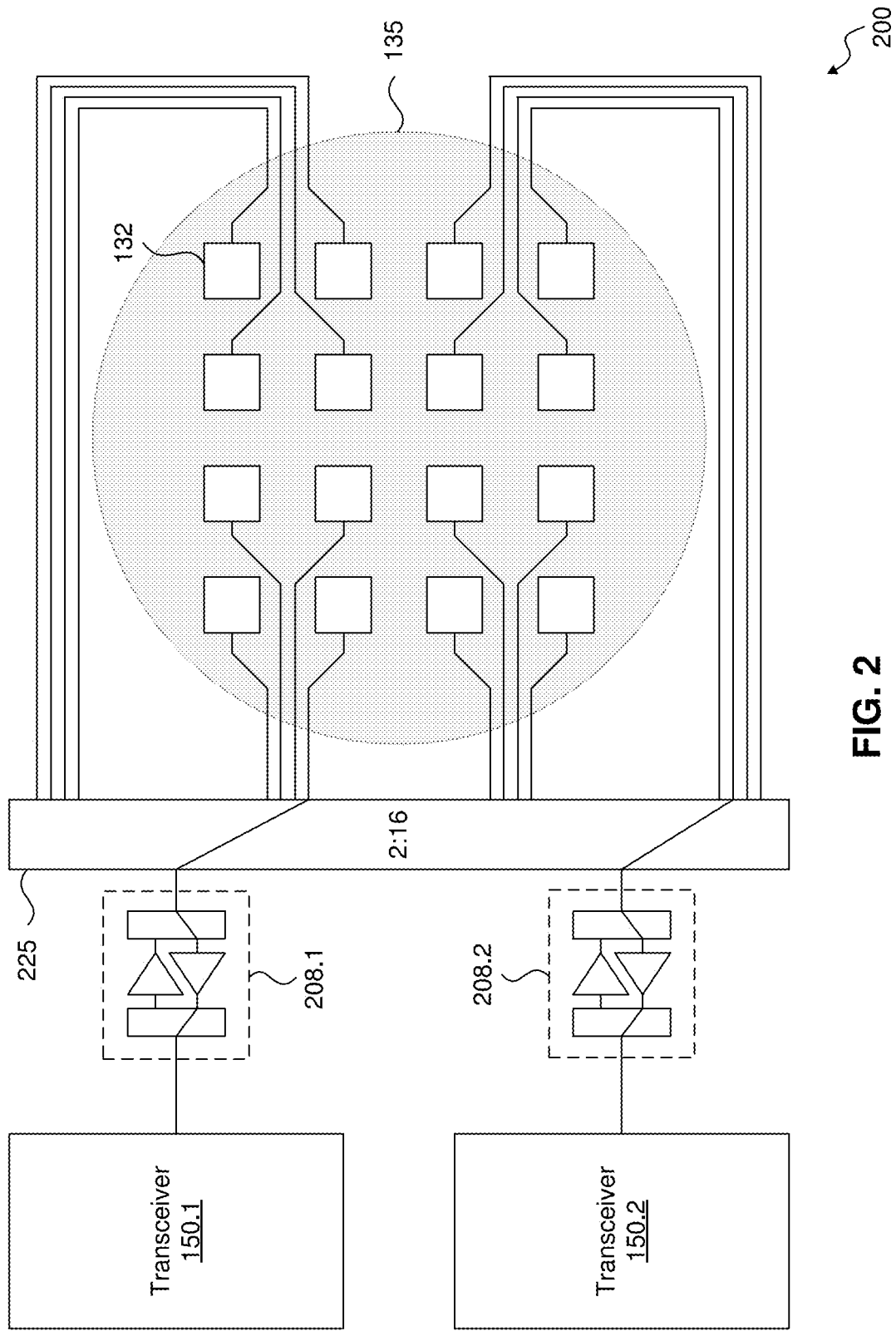
FIG. 2 illustrates a communication device according to an exemplary aspect of the present disclosure.

FIG. 2 illustrates a communication device 200 according to an exemplary aspect that includes a lens 135 disposed on the antenna elements 132 to form a lensing array.

In an exemplary aspect, the communication device 200 includes two transceivers 150.1 and 150.2, where the transceiver 150.1 may be the primary transceiver chain while the transceiver 150.2 is the secondary transceiver chain. In other aspects, the communication device can include more or fewer transceivers.

In this aspect, the antenna 130 includes 16 antenna elements that are connected to the transceivers 150.1, 150.2 via a switch 225. The switch 225 is a 2:16 switch matrix that selectively connects the 4×4 lensing array to the transceivers 150. In operation, each of the transceivers 150 may connect to and use any one of the 16 antenna elements 132 in the lensing array. The transceivers 150.1 and 150.2 are connected to the switch 225 via amplifier heads 208.1 and 208.2, respectively. The amplifier heads 208 include a power amplifier and low-noise amplifier (LNA). As is understood by one of ordinary skill in the art, the transceiver chain may include one or more other various electronic components (e.g., other amplifiers, filters, isolators, mixers, etc.). However these components are omitted for brevity and clarity of disclosure.

In this aspect, the number of radiating/antenna elements 132 and the type of the lens 135 (e.g. optical or diffraction) can be selected based on system parameters such as required directivity, beam width/resolution, form factor constraints, and/or other factors as would be understood by one of ordinary skill in the art.

Figure 3A:
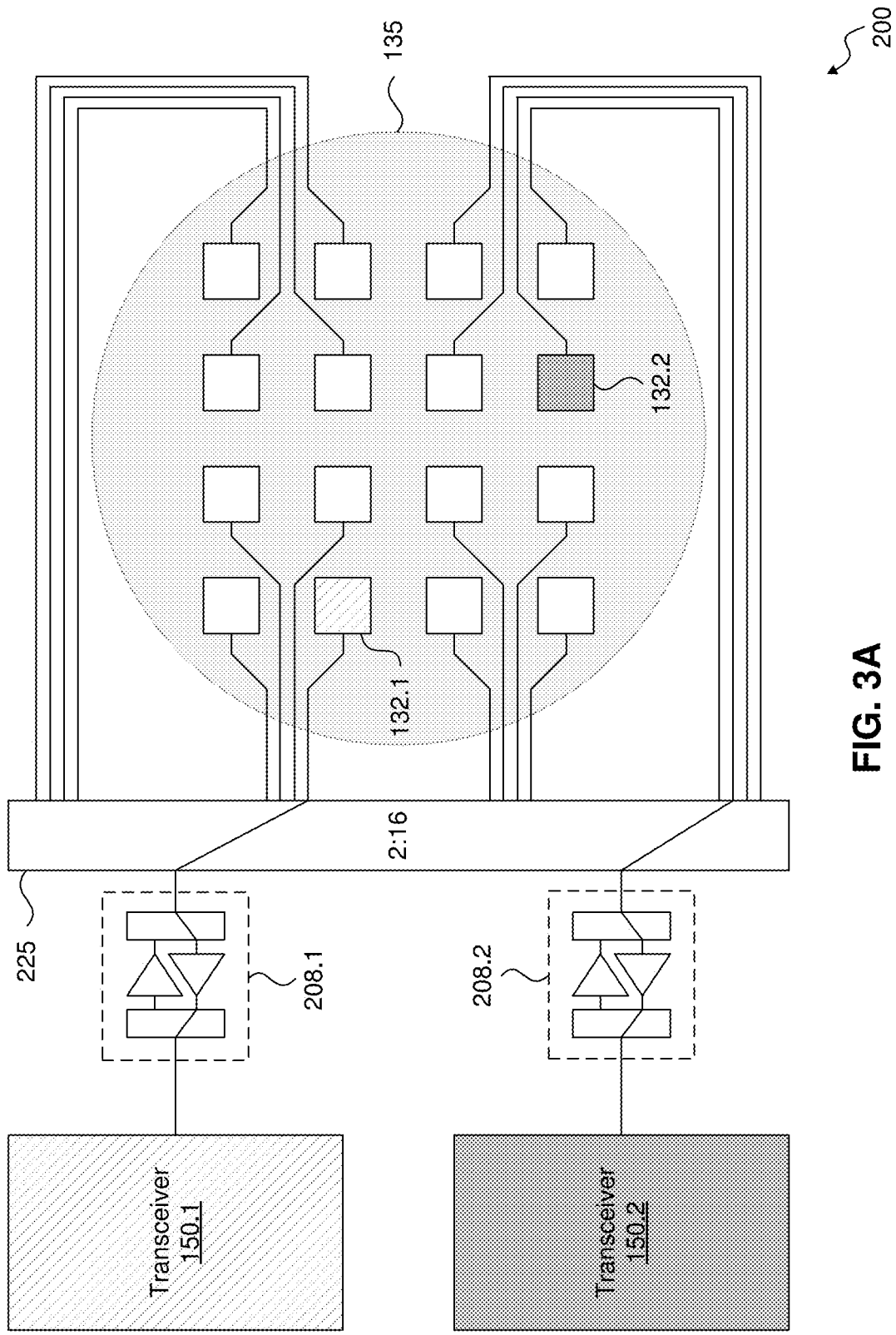
FIG. 3A illustrates a communication device according to an exemplary aspect of the present disclosure.

In an exemplary aspect, with additional reference to FIGS. 3A-3B, the transceiver 150.1 may be configured to connect to the radiating element 132.1 that provides the best angle of arrival or signal-to-noise ratio (SNR) so as to function as the "main" transmit/receive radio while the other transceiver(s) (e.g. transceiver 150.2) may be configured to sequentially step through the other radiating elements 132 to determine alternate angles of arrival. For example, the main beam 302.1 (transceiver 150.1) can be configured to operate along the line-of-sight (LOS) path while the alternate beam 302.2 (transceiver 150.2) may lock onto a reflection path. If the main beam is interrupted (e.g. due to an obstacle appearing between the AP and communication device 200), the communication device 200 can quickly switch to the alternate path 302.2 without losing the link due to the need to re-train the beam.

In an exemplary aspect, the second angle of arrival (transceiver 150.2) may be used as a diversity radio to improve the link budget of the main radio (transceiver 150.1) by using techniques such as maximum ratio combining.

As is appreciated by those skilled in the art, many wireless applications involve mobile or nomadic operation. Advantageously, the additional transceiver(s) 150 may be used to connect to multiple APs. This allows the communication device 200 to enable additional modes of operation to improve the robustness of the link, such as cooperative beam forming (from multiple APs to a single client) or soft hand-offs between APs as the communication device 200 is in motion.

Figure 4:
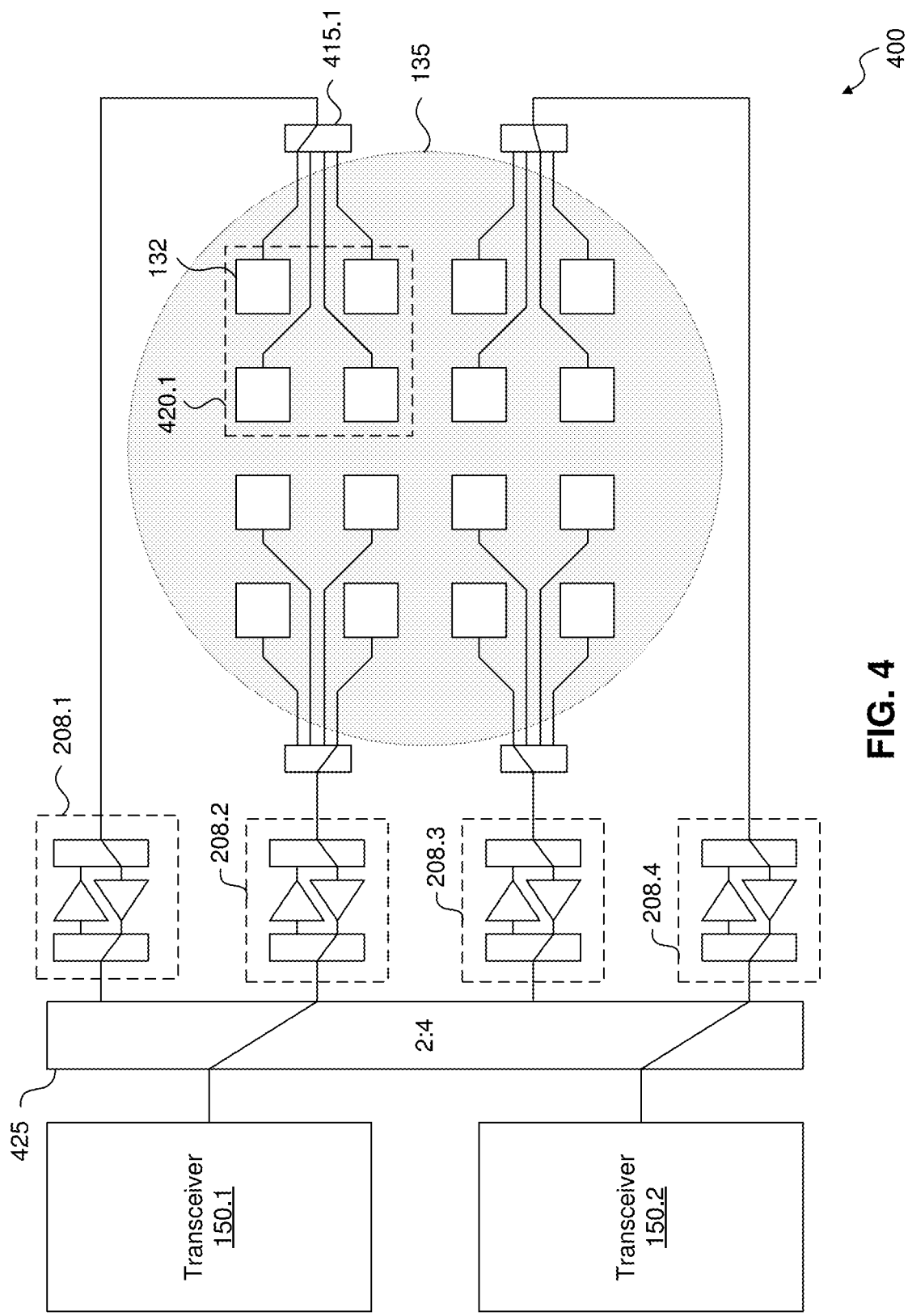
FIG. 4 illustrates a communication device according to an exemplary aspect of the present disclosure.

FIG. 4 illustrates a communication device 400 according to an exemplary aspect. The communication device 400 is similar to the communication device 200 but the antenna elements 132 are connected to the transceivers 150 via a 2:4 switch 425 and switches 415.

In this example, the antenna elements 132 are arranged in subsets 420, where each subset is connected to the 2:4 switch 425 via a respective switch 415.

In an exemplary aspect, the communication device 400 includes 16 antenna elements 132 arranged in a 4×4 array. The 16 antenna elements 132 are arranged into four subsets 421.1-420.4, with each subset 420 includes four antenna elements 132. In this example, the switch 415 is a single-pull, four throw switch (i.e. a 1:4 switch), and the communication device 400 includes four amplifier heads 208, with a respective amplifier head 208 being connected between the 2:4 switch 425 and the respective switch 415.

Advantageously, the communication device 400 provides a lower loss between the amplifier head 208 and the antenna elements 132. However, the transceiver 150.2 is limited to a connection to only three of the four subsets 420.

Figure 5:
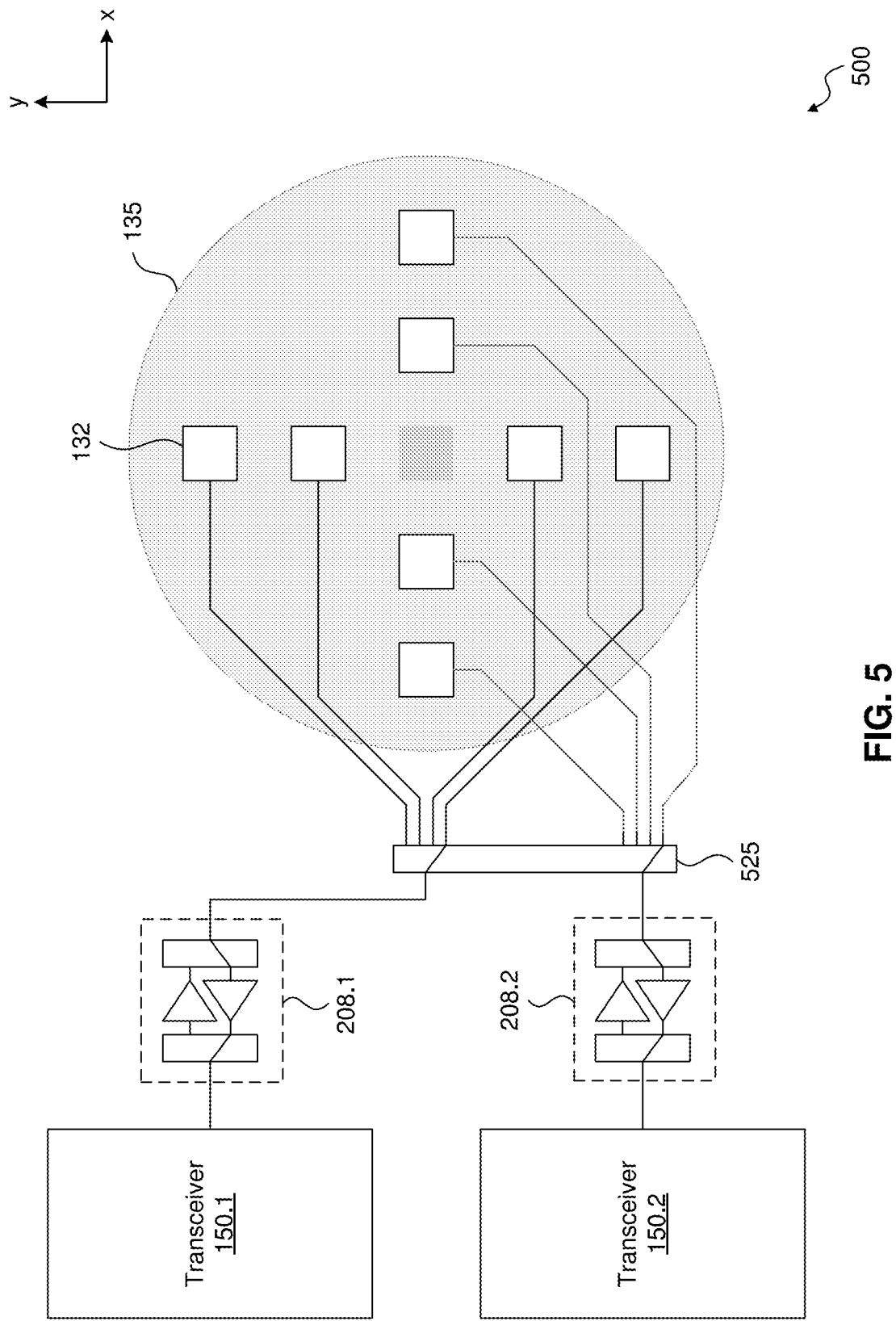
FIG. 5 illustrates a communication device according to an exemplary aspect of the present disclosure.

FIG. 5 illustrates a communication device 500 according to an exemplary aspect. The communication device 500 is similar to the communication devices 200/400, but includes two linear arrays of antenna elements 132 (e.g. a vertical array and a horizontal array). The communication device 500 includes a 2:8 switch 525, where the transceivers 150 are connected to switch 525 via a respective amplifier head 208.

In this aspect, the communication device 500 can exploit the superposition effect by including the two linear arrays in x and y directions. The arrangement advantageously provides angular beam steering and resolution with a smaller number of radiating element 132. This simplifies the overall system complexity and cost as well as reduce the insertion loss of the switch matrix 525, thereby improving range and/or throughput.

Figure 6:
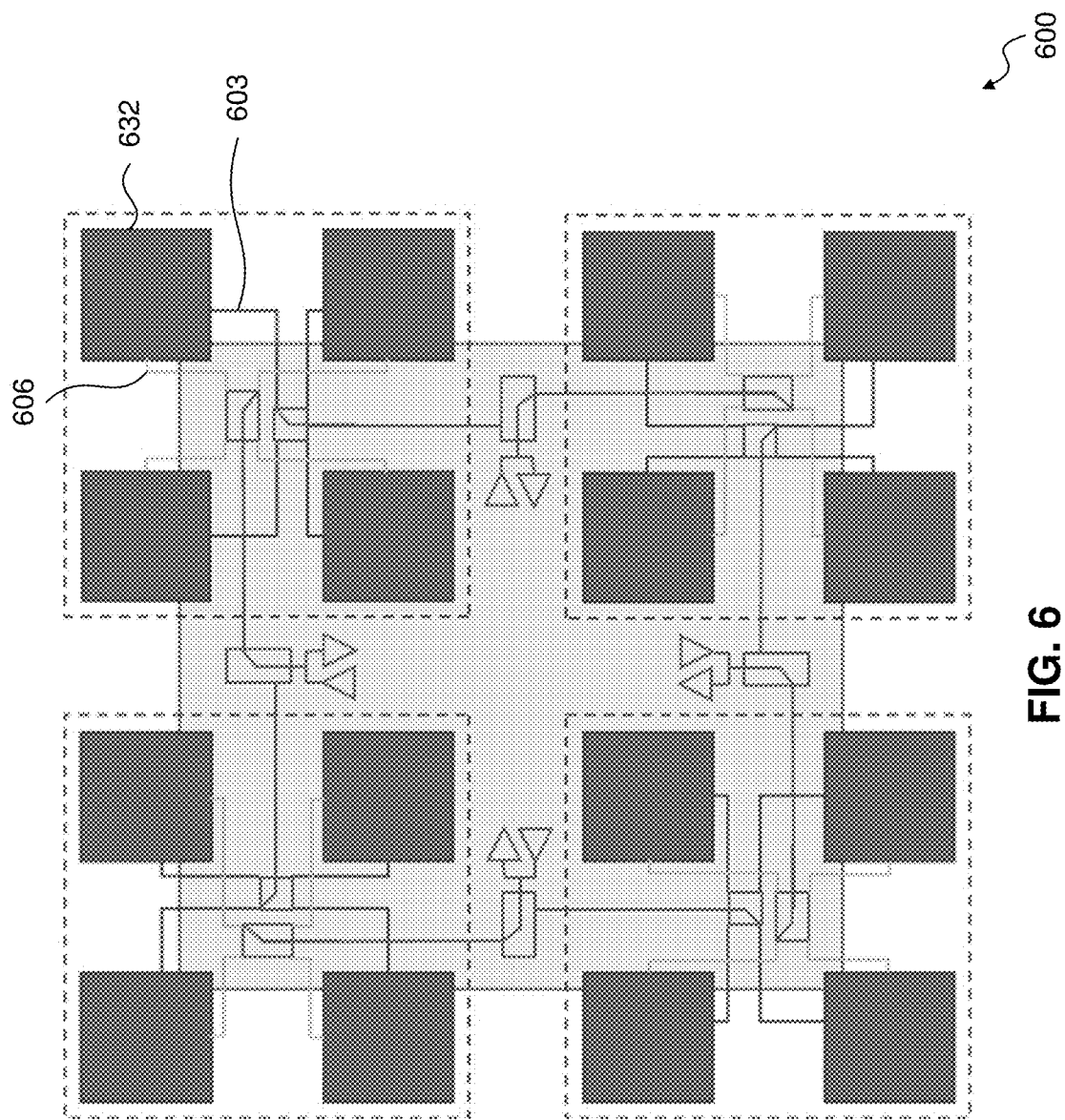
FIG. 6 illustrates an antenna system according to an exemplary aspect of the present disclosure.

FIG. 6 illustrates an antenna array 600 according to an exemplary aspect. The antenna array is similar to the antenna arrays of the other aspects of the disclosure but includes antenna elements 632 that are configured for dual polarization. In particular, each of the antenna elements 632 include a vertical polarization port 603 (blue connection) and a horizontal polarization port 606 (orange connection).

In an exemplary aspect, an antenna element 632 can be driven simultaneously by both the first and second transceivers 150.1 and 150.2 (not shown). For example, transceiver 150.1 can drive the vertical polarization port 603 of the antenna element 632 while the transceiver 150.2 can drive the horizontal polarization port 606 to support a 2×2 MIMO operation. In another aspect, the antenna array 600 can be configured for Multi-link operation by driving two antenna elements 632 independently and simultaneously by the transceivers 150.1 and 150.2, respectively (not shown).

In an exemplary aspect, the antenna array 600 can be extended to higher-order MIMO or multi-link systems to provide a system with a reduced overhead compared to conventional phased array implementations. For example, with four transceivers chains, any combination from 4×4 MIMO and up to four simultaneous links (including 2 independent 2×2 MIMO) and be achieved according to aspects of the disclosure. This is particularly advantageous as the system provides a reduced overhead compared to a phased-array configuration that would require 16×4 chains.

Figure 7:
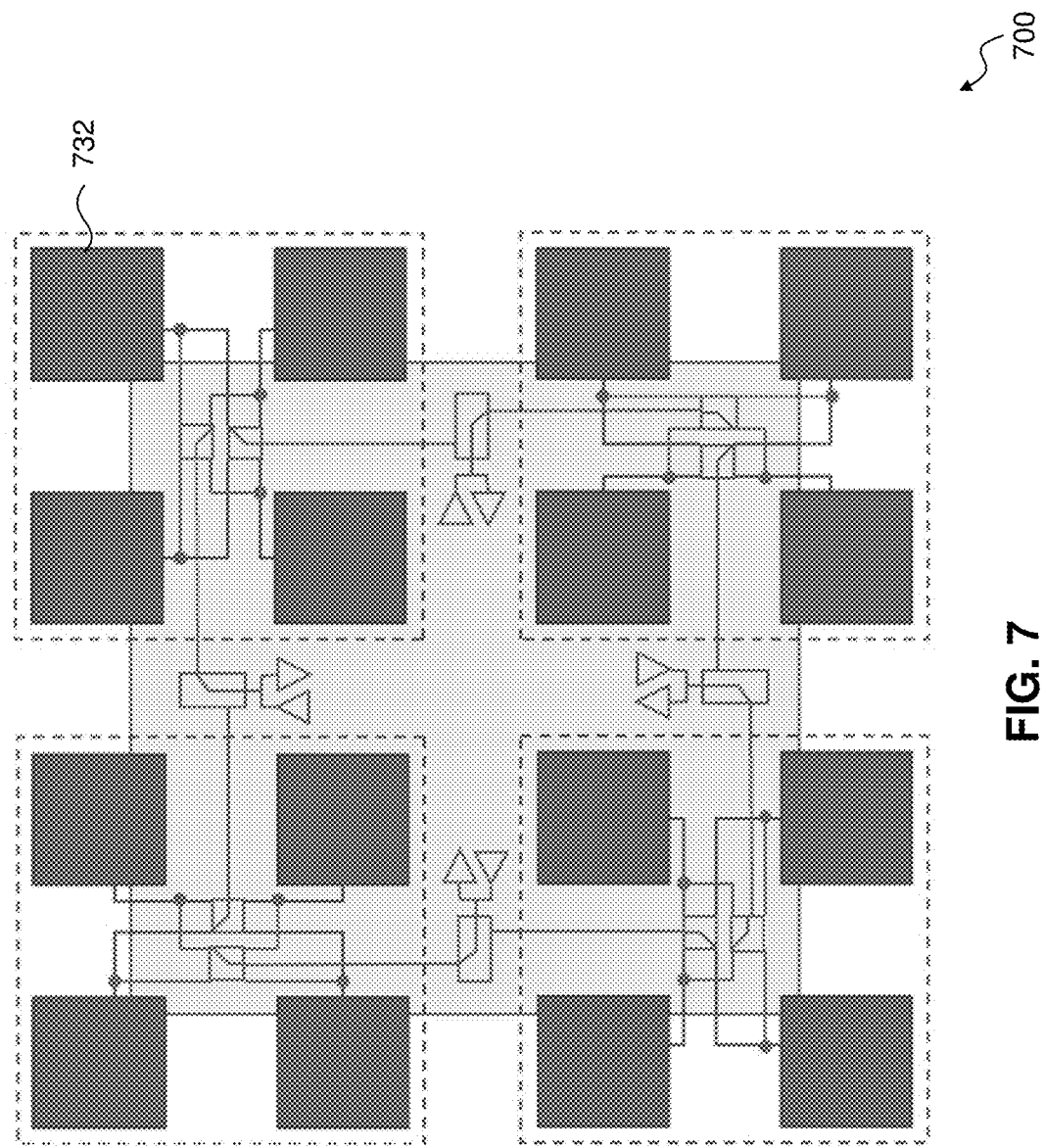
FIG. 7 illustrates an antenna system according to an exemplary aspect of the present disclosure.

FIG. 7 illustrates an antenna array 700 according to an exemplary aspect. The antenna array 700 is similar to the antenna array 600 that includes a modified arrangement of the switches between the amplifier heads and the antenna elements 732. In an exemplary aspect, the antenna array 700 can be configured for 2×2 MIMO using two adjacent antenna elements 732. In this example, the transceivers 150 can simultaneously drive two adjacent antenna elements 732 without increasing silicon size. In an exemplary aspect, each antenna element 732 are single polarization elements, and MIMO is achieved by using two adjacent antenna elements 732.

EXAMPLES

Example 1 is a communication device, comprising: a millimeter wave (mm-wave) antenna array means having antenna elements; a first transceiving means, selectively couplable to the antenna elements, for driving a first selected antenna element of the antenna elements to transmit a first beam from the selected first antenna element; a second transceiving, selectively couplable to the antenna elements, for driving a second selected antenna element of the antenna elements to transmit a second beam from the selected second antenna element; and a mm-wave lensing means for adjusting the first beam and the second beam as the first and second beams pass through the mm-wave lensing means.

Example 2 is the subject matter of Example 1, further comprising switching means for selectively coupling the first and the second transceiving means to respective antenna elements of the antenna elements.

Example 3 is the subject matter of any of Examples 1-2, wherein: the antenna elements are arranged in two or more subsets, each of the two or more subsets including two or more of the antenna elements; and the communication device further comprises subset switching means, each of the subset switching means for selectively coupling one of the two or more antenna elements of a respective subset to the switching means.

Example 4 is the subject matter of any of Examples 1-3, wherein the second transceiving means is configured to sequentially select different antenna elements to determine alternate angles of arrival.

Example 5 is the subject matter of Example 4, wherein the first transceiving means is configured to decouple from the first antenna element and couple to a different antenna element, based on the determined alternate angles of arrival, in response to a decrease in link quality associated with the first antenna element.

Example 6 is the subject matter of any of Examples 1-5, wherein the first and second beams have different angles of arrival, a second angle of arrival of the second beam being configured as a diversity link to increase link robustness of the communication device.

Example 7 is the subject matter of any of Examples 1-6, wherein first transceiving means and the second transceiving means are configured to independently and simultaneously drive the first and the second antenna elements, respectively, to provide a Multi-Link configuration.

Example 8 is the subject matter of any of Examples 1-6, wherein the first transceiving means and the second transceiving means are configured to independently and simultaneously drive the first and the second antenna elements, respectively, to perform cooperative beam forming in a multiple-input multiple-output (MIMO) configuration.

Example 9 is the subject matter of any of Examples 1-6, wherein the first transceiving means is configured to drive the first antenna element to communicate with a first access point (AP) and the second transceiving means is configured to drive the second antenna element to communicate with a second AP to perform soft hand-offs from the first AP to the second AP.

Example 10 is the subject matter of any of Examples 1-9, wherein the antenna elements are arranged in matrix having an equal number of rows and columns.

Example 11 is the subject matter of any of Examples 1-9, wherein the mm-wave antenna array comprises two linear arrays arranged orthogonal to each other.

Example 12 is the subject matter of any of Examples 1-11, wherein the mm-wave lensing means is a diffraction lens.

Example 13 is the subject matter of Example 12, wherein the diffraction lens is a Fresnel Zone Plate (FZP) lens.

Example 14 is a communication device, comprising: a millimeter wave (mm-wave) antenna array having antenna elements; a first transceiver selectively couplable to the antenna elements, the first transceiver being configured to drive a first selected antenna element of the antenna elements to transmit a first beam from the selected first antenna element; a second transceiver selectively couplable to the antenna elements, the second transceiver being configured to drive a second selected antenna element of the antenna elements to transmit a second beam from the selected second antenna element; and a mm-wave lens configured to adjust the first beam and the second beam as the first and second beams pass through the mm-wave lens.

Example 15 is the subject matter of Example 14, further comprising a switch configured to selectively couple the first and the second transceivers to respective antenna elements of the antenna elements.

Example 16 is the subject matter of any of Examples 14-15, wherein: the antenna elements are arranged in two or more subsets, each of the two or more subsets including two or more of the antenna elements; and the communication device further comprises subset switches, each of the subset switches being configured to selectively couple one of the two or more antenna elements of a respective subset to the switch.

Example 17 is the subject matter of any of Examples 14-16, wherein the second transceiver is configured to sequentially select different antenna elements to determine alternate angles of arrival.

Example 18 is the subject matter of Example 17, wherein the first transceiver is configured to decouple from the first antenna element and couple to a different antenna element, based on the determined alternate angles of arrival, in response to a decrease in link quality associated with the first antenna element.

Example 19 is the subject matter of Examples 14-18, wherein the first and second beams have different angles of arrival, a second angle of arrival of the second beam being configured as a diversity link to increase link robustness of the communication device.

Example 20 is the subject matter of any of Examples 14-19, wherein first transceiver and the second transceiver are configured to independently and simultaneously drive the first and the second antenna elements, respectively, to provide a Multi-Link configuration.

Example 21 is the subject matter of any of Examples 14-19, wherein the first transceiver and the second transceiver are configured to independently and simultaneously drive the first and the second antenna elements, respectively, to perform cooperative beam forming in a multiple-input multiple-output (MIMO) configuration.

Example 22 is the subject matter of any of Examples 14-19, wherein the first transceiver is configured to drive the first antenna element to communicate with a first access point (AP) and the second transceiver is configured to drive the second antenna element to communicate with a second AP to perform soft hand-offs from the first AP to the second AP.

Example 23 is the subject matter of any of Examples 14-22, wherein the antenna elements are arranged in matrix having an equal number of rows and columns.

Example 24 is the subject matter of any of Examples 14-22, wherein the mm-wave antenna array comprises two linear arrays arranged orthogonal to each other.

Example 25 is the subject matter of any of Examples 14-24, wherein the mm-wave lensing means is a diffraction lens.

Example 26 is the subject matter Example 25, wherein the diffraction lens is a Fresnel Zone Plate (FZP) lens.

Example 27 is a communication device, comprising: a millimeter wave (mm-wave) antenna array means having antenna elements; a first transceiving means, selectively couplable to the antenna elements, for driving a first selected antenna element of the antenna elements to transmit a first beam from the selected first antenna element; a second transceiving means, selectively couplable to the antenna elements, for driving a second selected antenna element of the antenna elements to transmit a second beam from the selected second antenna element; and a mm-wave lensing means for adjusting the first beam and the second beam as the first and second beams pass through the mm-wave lens.

Example 28 is the subject matter of Example 27, further comprising a switching means, for selectively coupling the first and the second transceiving means to respective antenna elements of the antenna elements.

Example 29 is the subject matter of any of Examples 27-28, wherein: the antenna elements are arranged in two or more subsets, each of the two or more subsets including two or more of the antenna elements; and the communication device further comprises subset switching means, each of the subset switching means for selectively coupling one of the two or more antenna elements of a respective subset to the switching means.

Example 30 is the subject matter of any of Examples 27-29, wherein the second transceiving means is configured to sequentially select different antenna elements to determine alternate angles of arrival.

Example 31 is the subject matter of Example 30, wherein the first transceiving means is configured to decouple from the first antenna element and couple to a different antenna element, based on the determined alternate angles of arrival, in response to a decrease in link quality associated with the first antenna element.

Example 32 is the subject matter of Examples 27-31, wherein the first and second beams have different angles of arrival, a second angle of arrival of the second beam being configured as a diversity link to increase link robustness of the communication device.

Example 33 is the subject matter of any of Examples 27-32, wherein first transceiving means and the second transceiving means are configured to independently and simultaneously drive the first and the second antenna elements, respectively, to provide a Multi-Link configuration.

Example 34 is the subject matter of any of Examples 27-32, wherein the first transceiving means and the second transceiving means are configured to independently and simultaneously drive the first and the second antenna elements, respectively, to perform cooperative beam forming in a multiple-input multiple-output (MIMO) configuration.

Example 35 is the subject matter of any of Examples 27-32, wherein the first transceiving means is configured to drive the first antenna element to communicate with a first access point (AP) and the second transceiving means is configured to drive the second antenna element to communicate with a second AP to perform soft hand-offs from the first AP to the second AP.

Example 36 is the subject matter of any of Examples 27-35, wherein the antenna elements are arranged in matrix having an equal number of rows and columns.

Example 37 is the subject matter of any of Examples 27-35, wherein the mm-wave antenna array comprises two linear arrays arranged orthogonal to each other.

Example 38 is the subject matter of any of Examples 27-37, wherein the mm-wave lensing means is a diffraction lens.

Example 39 is the subject matter Example 38, wherein the diffraction lens is a Fresnel Zone Plate (FZP) lens.

Example 40 is an antenna system comprising: a mm-wave lens configured to adjust transmitted beams as they pass through the millimeter wave (mm-wave) lens; and a mm-wave antenna array having antenna elements, each of the antenna elements being configured to be selectively drivable to transmit a respective mm-wave beam, wherein: a first selected antenna element of the antenna elements is couplable to a first transceiver that is configured to drive the first selected antenna element of the antenna elements to transmit a first beam from the selected first antenna element; a second selected antenna element of the antenna elements is couplable to a second transceiver that is configured to drive the second selected antenna element of the antenna elements to transmit a first beam from the selected second antenna element; and the mm-wave lens is configured to adjust the first and second beams as they pass through the mm-wave lens.

Example 41 is the subject matter of Example 40, further comprising a switch configured to selectively couple respective antenna elements of the antenna elements to the first and the second transceivers.

Example 42 is the subject matter of any of Examples 40-41, wherein: the antenna elements are arranged in two or more subsets, each of the two or more subsets including two or more of the antenna elements; and the antenna system further comprises subset switches, each of the subset switches being configured to selectively couple one of the two or more antenna elements of a respective subset to the switch.

Example 43 is the subject matter of any of Examples 40-42, wherein the second antenna element and one or more other antenna elements of the antenna elements are configured to be sequentially selectable to determine alternate angles of arrival.

Example 44 is the subject matter of Example 43, wherein in response to a decrease in link quality associated with the first antenna element and based on the determined alternate angles of arrival, the first antenna element is decouplable from the first transceiver decouple from the first antenna element and couple to a different antenna element, based on the determined alternate angles of arrival, in response to a decrease in link quality associated with the first antenna element.

Example 45 is the subject matter of any of Examples 40-44, wherein the first and second beams have different angles of arrival, a second angle of arrival of the second beam being configured as a diversity link to increase link robustness of the antenna system.

Example 46 is the subject matter of any of Examples 40-45, wherein the first transceiver and the second transceiver are configured to independently and simultaneously drive the first and the second antenna elements, respectively, to provide a Multi-Link configuration.

Example 47 is the subject matter of any of Examples 40-45, wherein the first transceiver and the second transceiver are configured to independently and simultaneously drive the first and the second antenna elements, respectively, to perform cooperative beam forming in a multiple-input multiple-output (MIMO) configuration.

Example 48 is the subject matter of any of Examples 40-45, wherein the first transceiver is configured to drive the first antenna element to communicate with a first access point (AP) and the second transceiver is configured to drive the second antenna element to communicate with a second AP to perform soft hand-offs from the first AP to the second AP.

Example 49 is the subject matter of any of Examples 40-48, wherein the antenna elements are arranged in matrix having an equal number of rows and columns.

Example 50 is the subject matter of any of Examples 40-48, wherein the mm-wave antenna array comprises two linear arrays arranged orthogonal to each other.

Example 51 is a communication device comprising the antenna system of any of Examples 40-50.

Example 52 is the subject matter of Example 51, wherein the communication device comprises the first and second transceivers.

Example 53 is an apparatus as shown and described.

Example 54 is a communication device as shown and described.

Example 55 is an antenna system as shown and described.

Conclusion

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit includes an analog circuit, a digital circuit, state machine logic, other structural electronic hardware, or a combination thereof. A processor includes a microprocessor, a digital signal processor (DSP), central processing unit (CPU), application-specific instruction set processor (ASIP), graphics and/or image processor, multi-core processor, or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to communication protocols that utilize the millimeter wave (mm-Wave) spectrum (e.g., 24 GHz-300 GHz), such as WiGig (IEEE 802.11ad and/or IEEE 802.11ay) which operates at 60 GHz, and/or one or more 5G protocols using, for example, the 28 GHz frequency spectrum. The exemplary aspects can be applied to other wireless communication protocols/standards (e.g., LTE or other cellular protocols, other IEEE 802.11 protocols, etc.) as would be understood by one of ordinary skill in the relevant arts.

The invention claimed is:

1. A communication device, comprising:
   a millimeter-wave (mm-wave) antenna array having antenna elements;
   a first transceiver selectively couplable to the antenna elements, the first transceiver being configured to drive a first selected antenna element of the antenna elements to transmit a first beam from the selected first antenna element;
   a second transceiver selectively couplable to the antenna elements, the second transceiver being configured to: drive a second selected antenna element of the antenna elements to transmit a second beam from the selected second antenna element, and sequentially select different antenna elements to determine alternate angles of arrival, wherein the first transceiver is further configured to decouple from the first selected antenna element and couple to a different antenna element based on the determined alternate angles of arrival and in response to a decrease in link quality associated with the first selected antenna element; and
   a mm-wave lens configured to adjust the first beam and the second beam as the first and second beams pass through the mm-wave lens.

2. The communication device of claim 1, further comprising a switch configured to selectively couple the first and the second transceivers to respective antenna elements of the antenna elements.

3. The communication device of claim 2, wherein: the antenna elements are arranged in two or more subsets, each subset of the two or more subsets including two or more of the antenna elements; and the communication device further comprises subset switches, each of the subset switches being configured to selectively couple one of the two or more antenna elements of a respective subset to the switch.

4. The communication device of claim 1, wherein the first and second beams have different angles of arrival, a second angle of arrival of the second beam being configured as a diversity link to increase link robustness of the communication device.

5. The communication device of claim 1, wherein the first transceiver and the second transceiver are configured to independently and simultaneously drive the first and the second selected antenna elements, respectively, to provide a Multi-Link configuration.

6. The communication device of claim 1, wherein the first transceiver and the second transceiver are configured to independently and simultaneously drive the first and the second selected antenna elements, respectively, to perform cooperative beam forming in a multiple-input multiple-output (MIMO) configuration.

7. The communication device of claim 1, wherein the first transceiver is configured to drive the first selected antenna element to communicate with a first access point (AP) and the second transceiver is configured to drive the second selected antenna element to communicate with a second AP to perform soft hand-offs from the first AP to the second AP.

8. The communication device of claim 1, wherein the antenna elements are arranged in matrix having an equal number of rows and columns.

9. The communication device of claim 1, wherein the mm-wave antenna array comprises two linear arrays arranged orthogonal to each other.

10. The communication device of claim 1, wherein the mm-wave lens is a diffraction lens.

11. The communication device of claim 10, wherein the diffraction lens is a Fresnel Zone Plate (FZP) lens.

12. An antenna system comprising:
   a millimeter-wave (mm-wave) lens configured to adjust transmitted beams as they pass through the mm-wave lens; and
   a mm-wave antenna array having antenna elements, each of the antenna elements being configured to be selectively drivable to transmit a respective mm-wave beam, wherein:
     a first selected antenna element of the antenna elements is couplable to a first transceiver that is configured to drive the first selected antenna element of the antenna elements to transmit a first beam from the selected first antenna element;
     a second selected antenna element of the antenna elements is couplable to a second transceiver that is configured to drive the second selected antenna element of the antenna elements to transmit a second beam from the selected second antenna element, wherein the second selected antenna element and one or more other antenna elements of the antenna elements are configured to be sequentially selectable to determine alternate angles of arrival, the first selected antenna element being decouplable from the first transceiver, to decouple from the first selected antenna element and couple to a different antenna element, based on the determined alternate angles of arrival and in response to a decrease in link quality associated with the first selected antenna element; and the mm-wave lens is configured to adjust the first and second beams as they pass through the mm-wave lens.

13. The antenna system of claim 12, further comprising a switch configured to selectively couple respective antenna elements of the antenna elements to the first and the second transceivers.

14. The antenna system of claim 13, wherein:
the antenna elements are arranged in two or more subsets, each subset of the two or more subsets including two or more of the antenna elements; and
the antenna system further comprises subset switches, each of the subset switches being configured to selectively couple one of the two or more antenna elements of a respective subset to the switch.

15. The antenna system of claim 12, wherein the first and second beams have different angles of arrival, a second angle of arrival of the second beam being configured as a diversity link to increase link robustness of the antenna system.

16. The antenna system of claim 12, wherein the first transceiver and the second transceiver are configured to independently and simultaneously drive the first and the second selected antenna elements, respectively, to provide a Multi-Link configuration.

17. The antenna system of claim 12, wherein the first transceiver and the second transceiver are configured to independently and simultaneously drive the first and the second selected antenna elements, respectively, to perform cooperative beam forming in a multiple-input multiple-output (MIMO) configuration.

18. The antenna system of claim 12, wherein the first transceiver is configured to drive the first selected antenna element to communicate with a first access point (AP) and the second transceiver is configured to drive the second selected antenna element to communicate with a second AP to perform soft hand-offs from the first AP to the second AP.

19. The antenna system of claim 12, wherein the antenna elements are arranged in matrix having an equal number of rows and columns.

20. The antenna system of claim 12, wherein the mm-wave antenna array comprises two linear arrays arranged orthogonal to each other.

21. A communication device comprising the antenna system of claim 12.

* * * * *